United States Patent
Colosimo et al.

(12) 
(10) Patent No.: US 10,396,578 B1
(45) Date of Patent: Aug. 27, 2019

(54) WIRELESS CHARGING SYSTEMS WITH MULTIPLE POWER RECEIVING DEVICES

(71) Applicant: Apple Inc., Cupertino, CA (US)

(72) Inventors: Joseph W. Colosimo, Sunnyvale, CA (US); Alexei E. Kosut, Campbell, CA (US); Mahdi Hamzeh, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/365,454

(22) Filed: Mar. 26, 2019

Related U.S. Application Data

(63) Continuation of application No. 16/148,958, filed on Oct. 1, 2018, now Pat. No. 10,277,046, which is a continuation of application No. 16/005,498, filed on Jun. 11, 2018, now Pat. No. 10,110,030.

(60) Provisional application No. 62/654,940, filed on Apr. 9, 2018.

(51) Int. Cl.
| | |
|---|---|
| *H02J 7/00* | (2006.01) |
| *H02J 50/40* | (2016.01) |
| *H02J 7/02* | (2016.01) |
| *H02J 50/12* | (2016.01) |
| *H01F 38/14* | (2006.01) |

(52) U.S. Cl.
CPC ............ *H02J 7/0047* (2013.01); *H02J 7/025* (2013.01); *H02J 50/12* (2016.02); *H02J 50/40* (2016.02); *H01F 38/14* (2013.01)

(58) Field of Classification Search
CPC combination set(s) only.
See application file for complete search history.

(56) References Cited

U.S. PATENT DOCUMENTS

| | | | |
|---|---|---|---|
| 9,444,283 B2 * | 9/2016 | Son ..................... | H02J 7/025 |
| 10,110,030 B1 | 10/2018 | Colosimo et al. | |
| 2011/0234156 A1 * | 9/2011 | Fujita ................... | H02J 7/0027 320/108 |
| 2011/0260532 A1 * | 10/2011 | Tanabe ................. | H01M 10/44 307/17 |
| 2012/0112539 A1 * | 5/2012 | Yamamoto ........... | H02J 7/0021 307/11 |

* cited by examiner

*Primary Examiner* — Travis R Hunnings
(74) *Attorney, Agent, or Firm* — Treyz Law Group, P.C.; Joseph F. Guihan

(57) ABSTRACT

A wireless charging system may include a wireless power transmitting device that receives multiple wireless power receiving devices. A primary power receiving device that is used to display battery charge status information for other power receiving devices on the power transmitting device may be referred to as a hero device. The other wireless power receiving devices may be referred to as paired devices. When a paired device is added to a wireless power transmitting device where a hero device is already present, the hero device may verify that the paired device is on the same mat as the hero device. The hero device and paired device may then synchronously output a user notification. When a paired device is present on a wireless power transmitting device, the paired device may send battery charge status information to the wireless power transmitting device at predetermined intervals.

20 Claims, 8 Drawing Sheets

WIRELESS CHARGING SYSTEMS WITH MULTIPLE POWER RECEIVING DEVICES

This application is a continuation of application Ser. No. 16/148,958, filed Oct. 1, 2018, which is a continuation of application Ser. No. 16/005,498, filed Jun. 11, 2018, which claims the benefit of provisional patent application No. 62/654,940, filed Apr. 9, 2018, which are hereby incorporated by reference herein in their entireties.

FIELD

This relates generally to power systems, and, more particularly, to wireless power systems for charging devices.

BACKGROUND

In a wireless charging system, a wireless charging mat wirelessly transmits power to an electronic device that is placed on the mat. The electronic device has a receiving coil and rectifier circuitry for receiving wireless alternating-current (AC) power from a coil in the wireless charging mat that is in the proximity of the receiving coil. The rectifier converts the received AC power into direct-current (DC) power.

SUMMARY

A wireless charging system may include a wireless power transmitting device that receives one or more wireless power receiving devices. To improve the user experience when charging multiple wireless power receiving devices using the wireless power transmitting device, the wireless power receiving devices and wireless power transmitting device may communicate.

When multiple wireless power receiving devices are present on the wireless power transmitting device, one of the wireless power receiving devices may serve as a primary wireless power receiving device that displays battery charge status information for all of the or a subset of the wireless power receiving devices present on the wireless power transmitting device. The primary wireless power receiving device that is used to display battery charge status information may be referred to as a hero device. The other wireless power receiving devices may be referred to as paired devices.

When a paired device is added to a wireless power transmitting device where a hero device is already present, the wireless power transmitting device may send a notification to the hero device indicating that a new object has been detected. The wireless power transmitting device may send a wireless power transmitting device identifier to the paired device. The paired device may send the wireless power transmitting device identifier to the hero device along with information identifying itself and its battery level. The hero device may compare the wireless power transmitting device identifier received from the paired device to a wireless power transmitting device identifier previously received from the wireless power transmitting device to determine if the paired device is on the same wireless power transmitting device as the hero device. Upon verifying that the paired device is on the same wireless power transmitting device as the hero device, the hero device and paired device may synchronously output a user notification such as an animation.

When a paired device is present on a wireless power transmitting device, the paired device may send its own unique device address and its battery charge status information to the wireless power transmitting device at predetermined intervals. The wireless power transmitting device may store this information. Then, when a hero device is added to the wireless power transmitting device, the wireless power transmitting device may transmit the battery charge status information of the paired device to the hero device using in-band communication.

DETAILED DESCRIPTION

A wireless power system may have a wireless power transmitting device such as wireless charging mat. The wireless power transmitting device may wirelessly transmit power to one or more wireless power receiving devices such as a wristwatch, cellular telephone, tablet computer, laptop computer, electric vehicle, accessories such as audio accessories (e.g., headphones, earbuds, etc.), computer mice, trackpads, stylus devices, a or other electronic equipment. In some cases, the wireless power receiving devices include battery cases (sometimes referred to as battery packs, supplemental batteries, covers, etc.). As an example, a wireless power receiving device may be a battery case for earbuds. The wireless power receiving device(s) may use power from the wireless power transmitting device for powering the device and for charging an internal battery.

Figure 1:
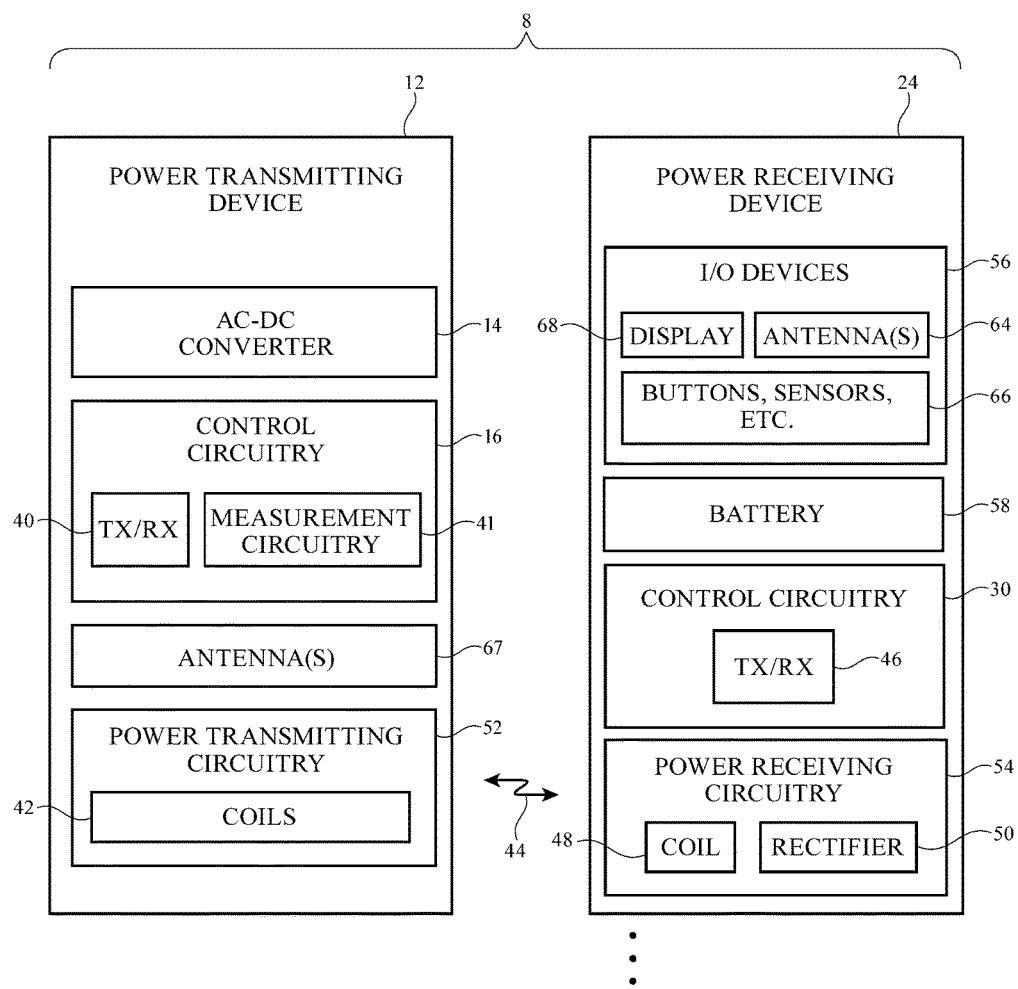
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 may include a wireless power transmitting device such as wireless power transmitting device 12 and may include one or more wireless power receiving devices such as wireless power receiving device 24. Wireless power transmitting device 12 may include control circuitry 16. Wireless power receiving device 24 may include control circuitry 30. Control circuitry in system 8 such as control circuitry 16 and control circuitry 30 may be used in controlling the operation of system 8. This control circuitry may include processing circuitry associated with microprocessors, power management units, baseband processors, digital signal processors, microcontrollers, and/or application-specific integrated circuits with processing circuits. This processing circuitry implements desired control and communications features in devices 12 and 24. For example, the processing circuitry may be used in determining power transmission levels, processing sensor data, processing user input, handling negotiations between devices 12 and 24, sending and receiving in-band and out-of-band data packets, and processing other information and using this information to adjust the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat that includes power adapter circuitry), may be a wireless charging mat that is coupled to a power adapter or other equipment by a cable, may be a portable device, may be equipment that has been incorporated into furniture, a vehicle, or other system, or may be other wireless power transfer equipment. Illustrative configurations in which wireless power transmitting device 12 is a wireless charging mat may sometimes be described herein as an example.

Power receiving device 24 may be a portable electronic device such as a wristwatch, a cellular telephone, a laptop computer, a tablet computer, wireless headphones, a wireless headphones case, or other equipment. Power transmitting device 12 may be coupled to a wall outlet (e.g., alternating current), may have a battery for supplying power, and/or may have another source of power. Power transmitting device 12 may have an AC-DC power converter such as power converter 14 for converting AC power from a wall outlet or other power source into DC power. DC power may be used to power control circuitry 16. During operation, a controller in control circuitry 16 may use power transmitting circuitry 52 to transmit wireless power to power receiving circuitry 54 of device 24. Power transmitting circuitry 52 may have switching circuitry (e.g., an inverter formed from transistors) that is turned on and off based on control signals provided by control circuitry 16 to create AC current signals through one or more coils 42. Coils 42 may be arranged in a planar coil array (e.g., in configurations in which device 12 is a wireless charging mat).

As the AC currents pass through one or more coils 42, alternating-current electromagnetic fields (signals 44) are produced that are received by one or more corresponding coils such as coil 48 in power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltages produced by rectifier 50 can be used in powering a battery such as battery 58 and can be used in powering other components in device 24. For example, device 24 may include input-output devices 56 such as one or more antennas 64, touch sensor components and other sensors 66 (e.g., buttons, accelerometers, force sensors, temperature sensors, light sensors, pressure sensors, gas sensors, moisture sensors, magnetic sensors, etc.), and a display 68. Input-output devices 56 and other components in power receiving device 24 may be powered by the DC voltages produced by rectifier 50 (and/or DC voltages produced by battery 58). Display 68 may be any desired type of display (e.g., a liquid crystal display, organic light-emitting diode display, etc.).

Device 12 and/or device 24 may communicate wirelessly using in-band or out-of-band communications. Device 12 may, for example, have wireless transceiver circuitry 40 that wirelessly transmits out-of-band signals to device 24 using an antenna (e.g., antenna 67). Wireless transceiver circuitry 40 may be used to wirelessly receive out-of-band signals from device 24 using the antenna. Wireless transceiver circuitry 40 may also transmit and receive wireless communication signals using coils 42. Device 24 may have wireless transceiver circuitry 46 that transmits out-of-band signals to device 12. Receiver circuitry in wireless transceiver 46 may use an antenna (e.g., antenna 64) to receive out-of-band signals from device 12. Wireless transceiver 46 in power receiving device 24 may also use one or more antennas 64 to communicate with other wireless power receiving devices. Antennas 64 may communicate at any desired frequencies. In one example, an antenna 64 may be used for Bluetooth® communications (e.g., frequencies between 2400 MHz and 2500 MHz).

Wireless transceiver circuitry 40 uses one or more coils 42 to transmit in-band signals to wireless transceiver circuitry 46 that are received by wireless transceiver circuitry 46 using coil 48. Any suitable modulation scheme may be used to support in-band communications between device 12 and device 24. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

During wireless power transmission operations, circuitry 52 supplies AC drive signals to one or more coils 42 at a given power transmission frequency. The power transmission frequency may be, for example, a predetermined frequency of about 125 kHz, at least 80 kHz, at least 100 kHz, less than 500 kHz, less than 300 kHz, or other suitable wireless power frequency. In some configurations, the power transmission frequency may be negotiated in communications between devices 12 and 24. In other configurations, the power transmission frequency is fixed.

During wireless power transfer operations, while power transmitting circuitry 52 is driving AC signals into one or more of coils 42 to produce signals 44 at the power transmission frequency, wireless transceiver circuitry 40 uses FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 uses FSK demodulation to extract the transmitted in-band data from signals 44. This approach allows FSK data (e.g., FSK data packets) to be transmitted in-band from device 12 to device 24 with coils 42 and 48 while power is simultaneously being wirelessly conveyed from device 12 to device 24 using coils 42 and 48.

In-band communications between device 24 and device 12 use ASK modulation and demodulation techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 42. Wireless transceiver circuitry 40 monitors the amplitude of the AC signal passing through coil(s) 42 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 42 while power is simultaneously being wirelessly conveyed from device 12 to device 24 using coils 42 and 48.

The above examples of in-band communication schemes (e.g., ASK modulation and FSK modulation) are merely illustrative. Other in-band communication techniques may be used if desired (e.g., transmitting a carrier wave at a different frequency than the power transmission frequency from the wireless power receiving device to the wireless power transmitting device using coils 42 and 48). In general, any communication of data between device 12 and device 24 using coils 42 and 48 may be referred to as in-band communication. Wireless power may optionally simultaneously be transferred between device 12 and device 24 during in-band communication.

Control circuitry 16 has external object measurement circuitry 41 (sometimes referred to as foreign object detection circuitry or external object detection circuitry) that detects external objects on a charging surface associated with device 12. Circuitry 41 can detect wireless power receiving devices 24 with at least one wireless power receiving coil that are capable of communicating with and/or receiving power from power transmitting device 12. Wireless power receiving devices with at least one wireless power receiving coil that are capable of communicating with and/or receiving power from power transmitting device 12 may sometimes be referred to as supported devices or compatible devices. Circuitry 41 may also detect unsupported or incompatible electronic devices (i.e., electronic devices that are not operable to wirelessly receive power from power transmitting device 12) and objects such as coins, keys, paper clips, and other metallic objects that may potentially be undesirably heated. For simplicity, incompatible electronic devices and other metallic objects such as coins, keys, and paper clips may all be referred to as foreign objects.

In an illustrative arrangement, measurement circuitry 41 of control circuitry 16 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, switching circuitry in device 12 may be adjusted by control circuitry 16 to switch each of coils 42 into use. As each coil 42 is selectively switched into use, control circuitry 16 uses the signal generator circuitry of signal measurement circuitry 41 to apply an excitation signal (sometimes referred to as an impulse signal or probe signal) to that coil while using the signal detection circuitry of signal measurement circuitry 41 to measure a corresponding response. Measurement circuitry in control circuitry 30 and/or in control circuitry 16 may also be used in making current and voltage measurements.

The characteristics of each coil 42 depend on whether any objects overlap that coil and also depend on whether a wireless power receiving device with a coil such as coil 48 of FIG. 1 is present, which could change the measured inductance of any overlapped or nearby coil 42. Signal measurement circuitry 41 is configured to measure signals at the coil while supplying the coil with signals at one or more frequencies (to measure coil inductances), signal pulses (e.g., so that measurement circuitry in the measurement circuitry can be used to make inductance and Q factor measurements), etc. Using measurements from measurement circuitry 41, the wireless power transmitting device determines whether an external object is present on the coils. If, for example, all of coils 42 exhibit their expected nominal response to the applied signals, control circuitry 16 can conclude that no external devices are present. If one of coils 42 exhibits a different response (e.g., a response varying from a normal no-objects-present baseline), control circuitry 16 can conclude that an external object (potentially a compatible wireless power receiving device) is present.

Figure 2:
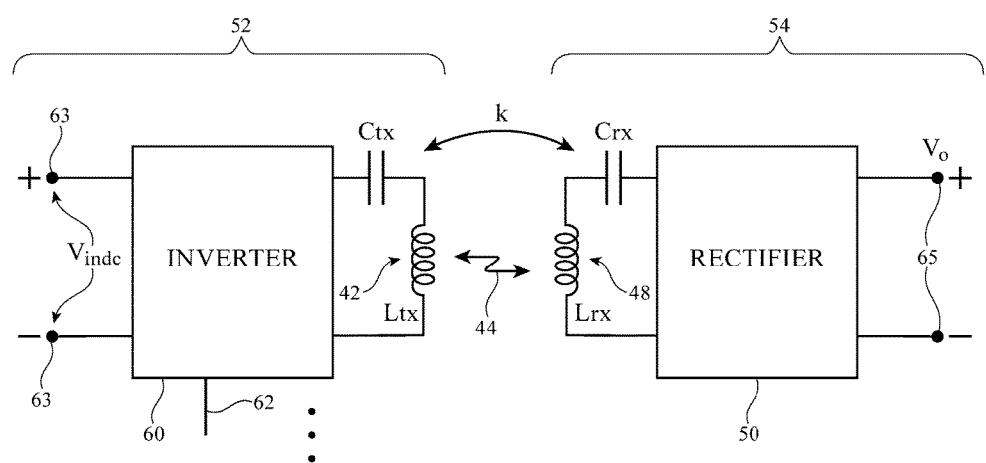
FIG. 2 is a circuit diagram of illustrative wireless power transmitting circuitry and illustrative wireless power receiving circuitry in accordance with an embodiment.

Illustrative circuitry of the type that may be used for forming power transmitting circuitry 52 and power receiving circuitry 54 of FIG. 1 is shown in FIG. 2. As shown in FIG. 2, power transmitting circuitry 52 may include drive circuitry (inverter circuitry) for supplying alternating-current drive signals to coils 42. With one illustrative configuration, the inverter circuitry includes multiple inverter circuits such as inverter 60 of FIG. 2 each of which is controlled by control circuitry 16 of device 12 and each of which is coupled to a respective one of coils 42.

Magnetic coupling coefficient k represents the amount of magnetic coupling between transmitting and receiving coils in system 8. Wireless power transfer efficiency scales with k, so optimum charging (e.g., peak efficiency) may be obtained by evaluating the coupling coefficient k for each coil and choosing appropriate coil(s) to use in transmitting wireless power to device 24 based on the coupling coefficients. After coupling coefficients k have been determined for each coil 42, control circuitry 16 can switch appropriate coil(s) 42 into use by selecting corresponding inverters 60 to use in driving signals into the coils.

Each inverter 60 has metal-oxide-semiconductor transistors or other suitable transistors. These transistors are modulated by an AC control signal from control circuitry 16 (FIG. 1) that is received on control signal input 62. The AC control signal controls modulate the transistors so that direct-current power (input voltage Vindc across direct-current power supply input terminals 63) is converted into a corresponding AC drive signal applied to coil 42 (having a self-inductance of Ltx) via its associated capacitor Ctx. This produces electromagnetic signals 44 (magnetic fields), which are electromagnetically (magnetically) coupled into coil 48 in wireless power receiving device 54.

The degree of electromagnetic (magnetic) coupling between coils 42 and 48 is represented by magnetic coupling coefficient k. Signals 44 are received by coil 48 (having a self-inductance of Lrx). Coil 48 and capacitor Crx are coupled to rectifier 50. During operation, the AC signals from coil 48 that are produced in response to received signals 44 are rectified by rectifier 50 to produce direct-current output power (e.g., direct-current rectifier output voltage Vo) across output terminals 65. Terminals 65 may be coupled to the load of power receiving device 24 (e.g., battery 58 and other components in device 24 that are being powered by the direct-current power supplied from rectifier 50).

The inductance Ltx of each coil 42 is influenced by magnetic coupling with external objects, so measurements of inductance Ltx for one or more of coils 42 in device 12 at various frequencies can reveal information on objects on power transmitting device 12. To conserve power, device 12 may be operated in a standby mode while awaiting use to supply wireless power to devices 8. Signal measurement circuitry 41 may monitor for the presence of external objects during standby. To probe a selected coil for changes in inductance Ltx due to external objects, an alternating-current probe signal (e.g., a sine wave, square wave, etc.) at a probe frequency may be produced. The inductance Ltx may then be derived based on the known value of Ctx and the frequency of the impulse response signal. The value of quality factor Q may be derived from L and the measured decay of the impulse response signal. Coupling factor k may be determined based on the output voltage of rectifier 50 (Vo), transmit coil inductance Ltx, receive coil inductance Lrx, known capacitance Ctx, and other factors.

If the measured value of Ltx for a given coil matches the normal Ltx value expected for each of coils 42 in the array of coils 42, control circuitry 16 can conclude that no external object suitable for wireless charging is present. If a given measured value of Ltx is different (e.g., larger) from that expected for an unloaded coil, control circuitry 42 can conclude that an external object is present and can perform additional measurement operations.

FIGS. 1 and 2 only show one wireless power receiving device 24. However, power transmitting device 12 may transmit wireless power to any desired number of wireless power receiving devices 24 (e.g., two wireless power receiving devices, three wireless power receiving devices, more than three wireless power receiving devices, etc.).

Figure 3:
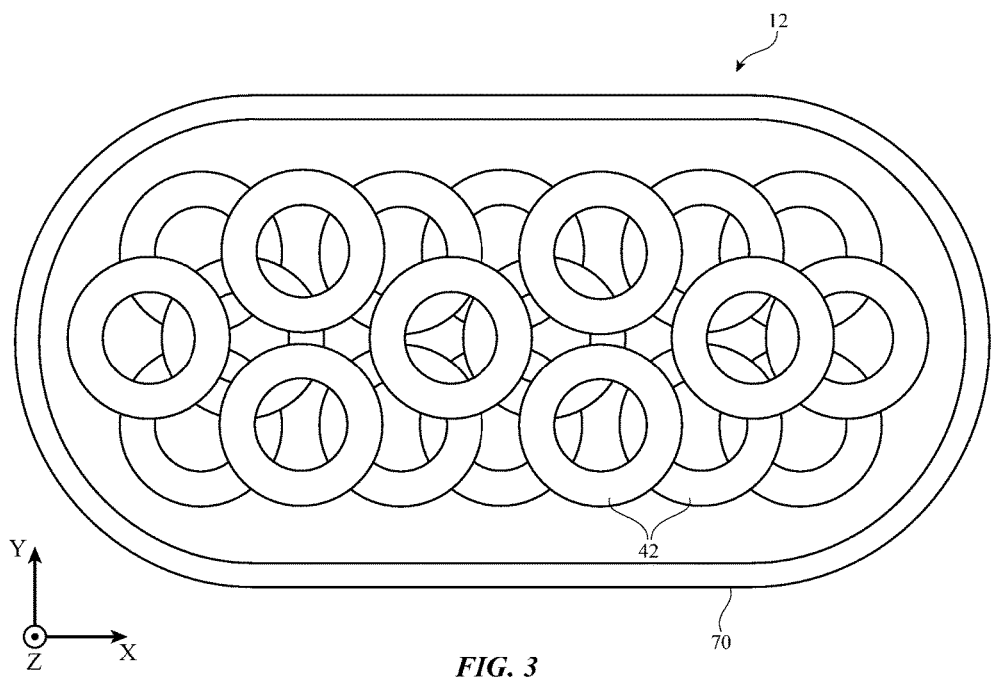
FIG. 3 is a top view of an illustrative wireless power transmitting device with a plurality of coils in accordance with an embodiment.

A top view of an illustrative configuration for device 12 in which device 12 has an array of coils 42 is shown in FIG. 3. Device 12 may, in general, have any suitable number of coils 42 (e.g., 22 coils, at least 5 coils, at least 10 coils, at least 15 coils, fewer than 30 coils, fewer than 50 coils, etc.). Coils 42 of device 12 may be covered by a planar dielectric structure such as a plastic member or other structure forming charging surface 70. The lateral dimensions (X and Y dimensions) of the array of coils 42 in device 12 may be 1-1000 cm, 5-50 cm, more than 5 cm, more than 20 cm, less than 200 cm, less than 75 cm, or other suitable size. Coils 42 may overlap or may be arranged in a non-overlapping configuration. In a non-overlapping configuration, the coils may be arranged in a single layer (e.g., in a plane parallel to the XY-plane) such that no part of any coil overlaps any of the other coils in the layer. Alternatively, in an overlapping arrangement (as shown in FIG. 3), coils 42 may be organized in multiple layers. Within each layer, the coils do not overlap. However, coils in one layer may overlap coils in one or more other layers (e.g., when viewed from above the outline of a given coil in a given layer may intersect the outline of a coil in another layer). In one illustrative example, the device may have three layers of coils (e.g., a lower layer having eight coils, a middle layer having seven coils, and an upper layer having seven coils). In general, each layer may have any suitable number of coils (e.g., at least 2 coils, at least 5 coils, fewer than 9 coils, fewer than 14 coils, 6-9 coils, etc.). Device 12 may have one layer of coils, at least two layers of coils, at least three layers of coils, at least four layers of coils, fewer than five layers of coils, 4-6 layers of coils, etc. Coils 42 can be placed in a rectangular array having rows and columns and/or may be tiled using a hexagonal tile pattern or other pattern.

A user of system 8 may sometimes place one or more wireless power receiving devices 24 on device 12. Foreign objects such as coins, keys, paper clips, scraps of metal foil, and/or other foreign metallic objects may also accidentally be present on surface 70. If coils 42 are used to transmit wireless power signals while foreign objects are present, eddy currents may be induced in the foreign objects. These eddy currents have the potential to undesirably heat the foreign objects. The foreign objects may include sensitive electronic equipment that could be potentially damaged upon exposure to fields from coils 42.

To avoid undesired heating of foreign objects, system 8 automatically detects whether conductive objects located on surface 70 correspond to supported devices (e.g., supported power receiving devices 24) or incompatible foreign objects (e.g., metallic objects without wireless power receiving coils) and takes suitable action. When an object is detected on charging surface 70 (i.e., by measuring inductance values of the coils), system 8 may attempt to determine if the object is a supported power receiving device using in-band communication. Sufficient power may be provided using coils 42 to enable in-band communication. If in-band communication is not established or it is determined that the object is not a compatible power receiving device, the coils will not begin wireless charging. If, however, one or more compatible wireless power receiving devices 24 are detected, it may be desirable to transfer wireless power to power receiving devices 24 using power transmitting device 12.

Even if a compatible wireless power receiving device is detected, power transmitting device 12 may not begin to transmit wireless power until determining that no foreign objects are present on the power transmitting device. If a foreign object is present on charging surface 70, wireless power transfer may be prevented (even though it is otherwise desirable to transmit wireless power to compatible device(s) 24). Steps may therefore be taken by system 8 to determine if a foreign object is present before beginning wireless charging.

In some situations, wireless power transmitting device 12 may receive (and transfer wireless power to) more than one wireless power receiving device. To improve the user experience when charging multiple wireless power receiving devices using the wireless power transmitting device, it may be desirable for the wireless power receiving devices and wireless power transmitting device to communicate. For example, when one wireless power receiving device is present on the wireless power transmitting device, the wireless power receiving device may display battery charge status information on its display. If another wireless power receiving device is then added to the wireless power transmitting device, it may be desirable for the originally present wireless power receiving device to acknowledge the presence of the newly added wireless power receiving device. Similarly, the newly added wireless power receiving device may obtain and display information associated with the originally present wireless power receiving device. When a new device is added to the wireless power transmitting device, both the newly added device and the originally present device may display an animation (or output another audio or visual cue) indicating that the newly added device has been added to the power transmitting device. The animations on the two devices may be displayed in synchronization (e.g., the output may commence at an identical time or nearly identical time such as times that are within 200 milliseconds of each other, within 100 milliseconds of each other, etc.).

The wireless power receiving devices may have a hierarchy in determining how battery charge status information and other information of the wireless power receiving devices is displayed. For example, one power receiving device present on the charging mat may act as a hero device (sometimes also referred to as a primary device). The hero device may display battery charge status information for both itself and other power receiving devices that are present on the charging mat. The other power receiving devices present on the charging mat (sometimes referred to as paired devices) may not display battery charge status information (because this information is already displayed on the hero device). A hierarchy may determine which wireless power receiving device acts as a hero device when multiple wireless power receiving devices are present on the wireless power transmitting device. For example, in one illustrative arrangement, a cellular telephone may have a higher precedence than a wristwatch device and a wristwatch device may have a higher precedence than a battery case for earbuds. Therefore, if a cellular telephone and wristwatch are simultaneously present on the charging mat, the cellular telephone may act as the hero device (and display battery charge status information for both the cellular telephone and the wristwatch). Alternatively, if a wristwatch and a battery case for earbuds are simultaneously present on the charging mat, the wristwatch may act as the hero device (and display battery charge status information for both the wristwatch and the battery case). Any desired device hierarchy may be used in determining which device will act as the hero device.

The type of device (e.g., cellular telephone, wristwatch, battery case) may not be the only factor in determining which power receiving device acts as the hero device for multiple wireless power receiving devices on a wireless power transmitting device. Wireless power receiving devices may only act as a hero device for other wireless power receiving devices in the same ecosystem as the wireless power receiving device. For example, each wireless power receiving device may have a known user. Only if the wireless power receiving devices belong to the same user will the hero device relationship be present. For example, if a cellular telephone that belongs to user A and a wristwatch device that belongs to user A are present on the charging mat, the cellular telephone may serve as the hero device for the wristwatch. However, if a cellular telephone that belongs to user A and a wristwatch device that belongs to user B are present on the charging mat, the cellular telephone may not serve as the hero device for the wristwatch.

A wireless power receiving device may only act as a hero device for other wireless power receiving devices on the same wireless power transmitting device. For example, consider a scenario where two wireless power transmitting devices are next to each other. A cellular telephone and wristwatch (both belonging to the same user) are both present on the first wireless power transmitting device. In this scenario, the cellular telephone acts as a hero device to the wristwatch. In an alternate scenario, the cellular telephone is present on the first wireless power transmitting device whereas the wristwatch is present on the second wireless power transmitting device. In this scenario, the cellular telephone does not serve as the hero device for the wristwatch.

Figure 4:
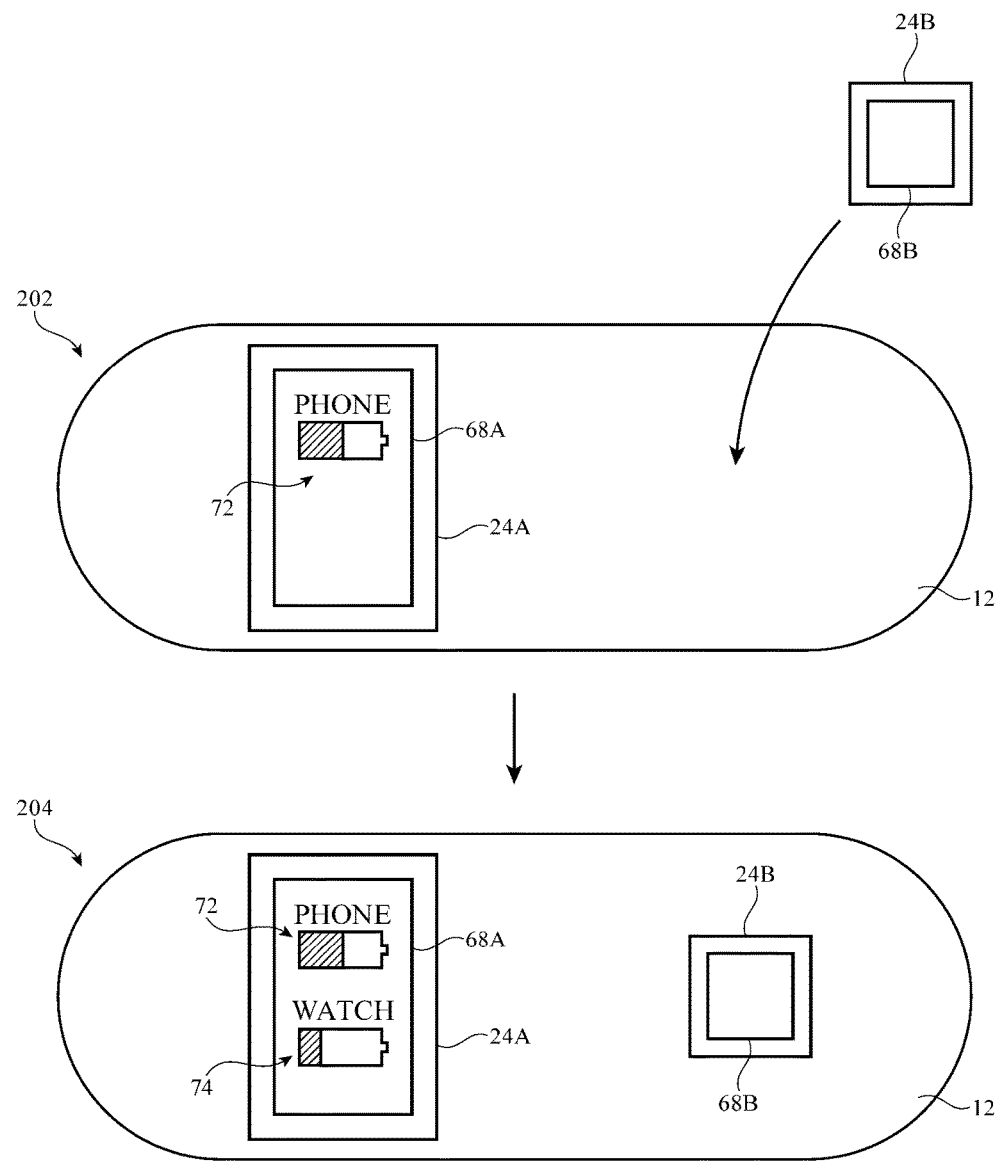
FIG. 4 is a top view showing an illustrative wireless power transmitting device with a primary wireless power receiving device on the wireless power transmitting device when a secondary wireless power receiving device is added to the wireless power transmitting device in accordance with an embodiment.

FIG. 4 shows a top view of a wireless power receiving device being added to a wireless power transmitting device with a wireless power receiving device already present on the wireless power transmitting device. As shown, at step 202 power receiving device 24A may be present on wireless power transmitting device 12. Power receiving device 24A may be a cellular telephone with a display 68A. Display 68A may display battery charge status information 72 (sometimes referred to as battery charge status, battery charge information, battery charge status indicator, etc.). Then, power receiving device 24B (having display 68B) is added to power transmitting device 12.

In the scenario shown in FIG. 4, wireless power receiving device 24A is a hero device (sometimes referred to as a primary device) whereas wireless power receiving device 24B is a paired device (sometimes referred to as a secondary device). The hero device may be a cellular telephone and the paired device may be a wristwatch, for example. When paired device 24B is added to the wireless power transmitting device 12, hero device 24A may determine that paired device 24B has been added. Hero device 24A may verify that paired device 24B is on the same wireless power transmitting device as the hero device. Hero device 24A may also verify that paired device 24B and hero device 24A have the same user. If devices 24A and 24B are on the same mat and have the same user, devices 24A and 24B may synchronously output an audio, visual, and/or haptic notification. Hero device 24A may then display battery charge status information for both the hero device 24A and the paired device 24B. As shown in FIG. 4, at step 204 display 68A of device 24A displays both battery charge status indicator 72 (that displays battery charge status information associated with cellular telephone 24A) and battery charge status indicator 74 (that displays battery charge status information associated with wristwatch 24B).

Numerous communications between the wireless power receiving devices and/or the wireless power transmitting device may be used to enable the aforementioned functionality. For example, wireless power transmitting device 12 may have an associated wireless power transmitting device identifier (sometimes referred to as simply a power transmitting device identifier or device identifier). Wireless power transmitting device 12 may transmit its device identifier to wireless power receiving device 24A using in-band communication or out-of-band communication. Wireless power receiving device 24A may store the wireless power transmitting device identifier (e.g., in memory). Then, when paired device 24B is added to power transmitting device 12, paired device 24B may receive the power transmitting device identifier. Paired device 24B then transmits this device identifier to hero device 24A along with its own paired device identifier and its battery charge level. These three pieces of information may be transmitted in a single step or in two or more stages. Hero device 24A may receive the power transmitting device identifier (e.g., using out-of-band communications) and compare the power transmitting device identifier from the paired device (indicating which power transmitting device the paired device is on) to the power transmitting device identifier stored in the hero device (indicating which power transmitting device the hero device is on). If the two power transmitting device identifiers match, the hero device determines that the paired device is present on the same mat as the hero device and may therefore display battery charge status information associated with the paired device.

When power receiving device 24B is added to charging mat 12, it may be desirable for devices 24A and 24B to synchronously output the user notification as soon as possible. If desired, all information may be communicated between wireless power receiving device 24A, wireless power receiving device 24B, and wireless power transmitting device 12 using in-band communication. For example, when paired device 24B is added to the charging mat, paired device 24B may provide a device identifier (e.g., identifying that device 24B is a wristwatch) to the charging mat using in-band communication. Charging mat 12 may then provide the device identifier associated with the newly added device (24B) to the already present device (24A) using in-band communication. While this type of communication scheme is possible, it may be quicker for devices 24A and 24B to communicate using out-of-band communications. For example, device 24B receives a wireless power transmitting device identifier, paired device identifier, and paired device battery charge level from the charging mat and then provides the wireless power transmitting device identifier directly to device 24A using out-of-band communications. This type of communication scheme may enable hero device 24A and paired device 24B to start communicating faster than if only in-band communications are used.

Figure 5:
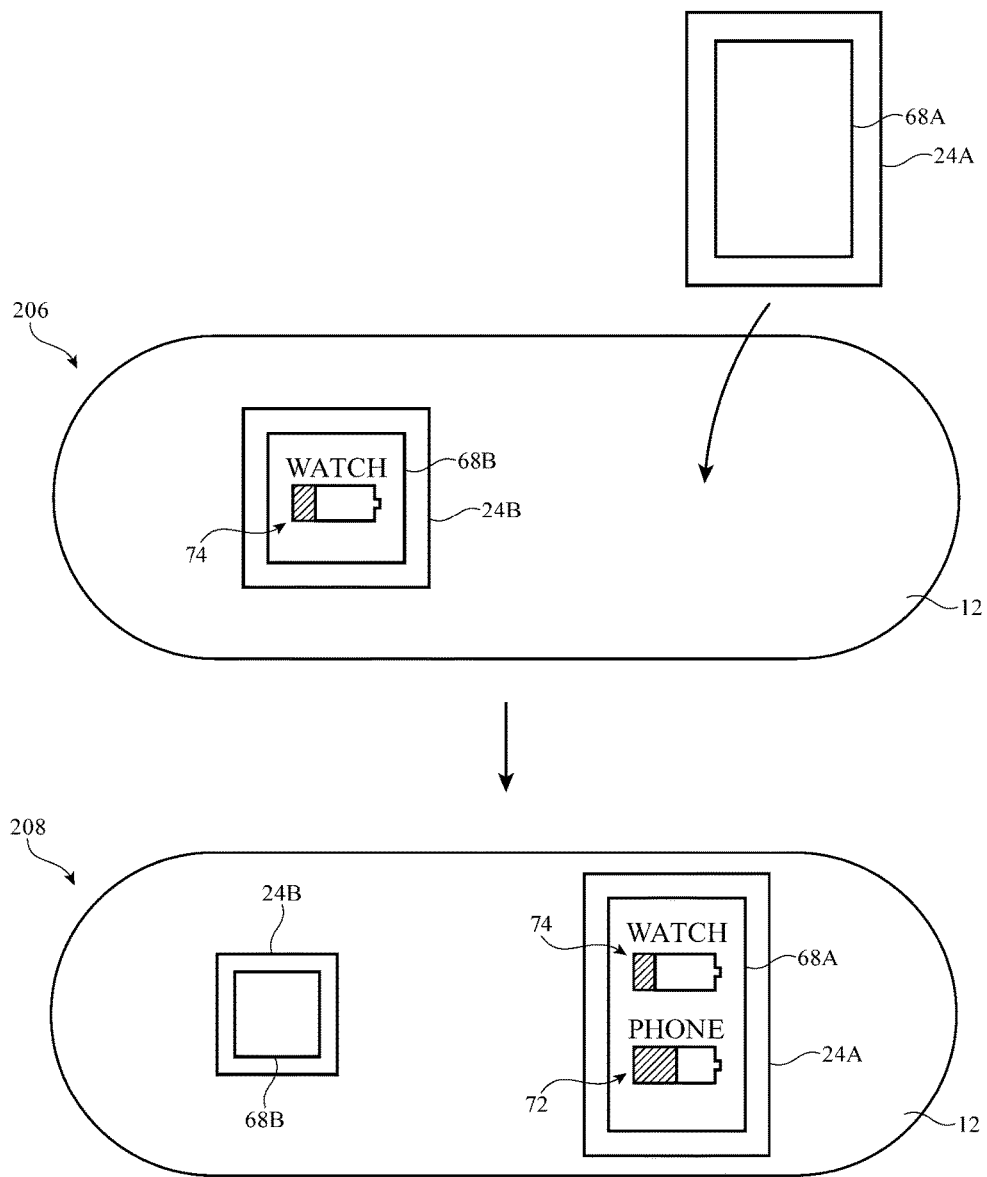
FIG. 5 is a top view showing an illustrative wireless power transmitting device with a secondary wireless power receiving device on the wireless power transmitting device when a primary wireless power receiving device is added to the wireless power transmitting device in accordance with an embodiment.

The example of FIG. 4 shows a scenario in which a paired device 24B is added to a wireless charging mat where hero device 24A is already present. FIG. 5 shows a different scenario where hero device 24A is added to a wireless charging mat where a paired device 24B is already present. As shown, at step 206 power receiving device 24B may be present on wireless power transmitting device 12. Power receiving device 24B (e.g., a wristwatch) may display battery charge status information 74 on display 68B. Then, power receiving device 24A is added to power transmitting device 12.

When hero device 24A is added to the wireless power transmitting device 12, hero device 24A may determine how many, if any, paired devices 24B are already present on the wireless power transmitting device. Hero device 24A may identify that paired device 24B is already present on the wireless power transmitting device. Hero device 24A may also verify that paired device 24B and hero device 24A have the same user. If devices 24A and 24B are on the same mat and have the same user, devices 24A and 24B may synchronously output an audio, visual, and/or haptic indicator. Hero device 24A may then display battery charge status information for both the hero device 24A and the paired device 24B. As shown in FIG. 5, at step 208 display 68A of device 24A displays both battery charge status indicator 72 (that displays battery charge status information associated with cellular telephone 24A) and battery charge status indicator 74 (that displays battery charge status information associated with wristwatch 24B).

Numerous communications between the wireless power receiving devices and/or the wireless power transmitting device may be used to enable the aforementioned functionality. In one scenario, paired device 24B may be in a first operating mode in which wireless communication (e.g., Bluetooth communication) is enabled. If wireless communication is enabled, paired device 24B may directly transmit information (e.g., using out-of-band communication) to hero device 24A indicating that paired device 24B is on the charging mat and indicating the current battery charge status of the paired device. Then, when hero device 24A is added to the charging mat, devices 24A and 24B will be able to synchronously output the notification quickly. In another scenario, however, device 24B may be in a second operating mode in which the wireless communication is disabled. If wireless communication is disabled, in-band communication may be used to inform hero device 24A of which devices are present on the charging mat (and the battery charge status of those devices). For example, while paired device 24B is on charging mat 12, paired device 24B may intermittently (e.g., every 1 second, every 10 seconds, every 30 seconds, every 60 seconds, etc.) send battery charge status information to the charging mat using in-band communication. Charging mat 12 may then keep that information ready to transmit. When hero device 24A is added, charging mat 12 may transmit the paired device identifier and the battery charge status information associated with paired device 24B to hero device 24A using in-band communication.

Figure 6:
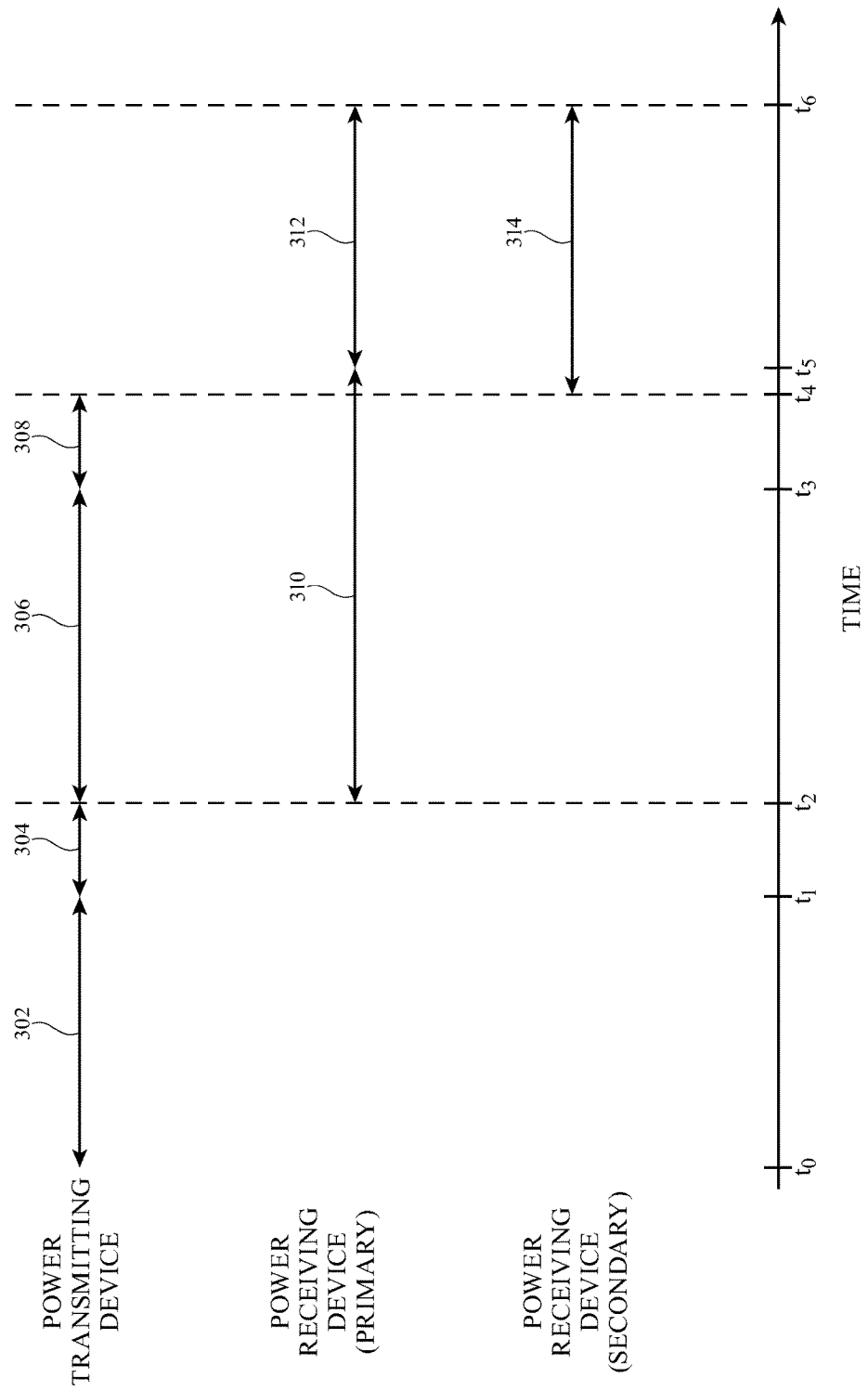
FIG. 6 is a timing diagram showing operations of an illustrative charging system when a secondary wireless power receiving device is added to a wireless power transmitting device where a primary wireless power receiving device is already present in accordance with an embodiment.

FIG. 6 is a timing diagram showing communications of a wireless power transmitting device, hero device, and paired device when a paired device is added to a wireless power transmitting device where a hero device is already present (e.g., as in FIG. 4). FIG. 6 shows actions of the power transmitting device (e.g., charging mat 12), primary power receiving device (e.g., hero device 24A), and secondary power receiving device (e.g., paired device 24B). At t0, power transmitting device 12 may scan coils 42 for newly added objects (during period 302). While scanning coils 42 for newly added objects, switching circuitry in device 12 may be adjusted by control circuitry 16 to selectively switch each of coils 42 into use. As each coil 42 is selectively switched into use, control circuitry 16 uses the signal generator circuitry of signal measurement circuitry 41 to apply an excitation signal (sometimes referred to as an impulse signal or probe signal) to that coil while using the signal detection circuitry of signal measurement circuitry 41 to measure a corresponding response. The characteristics of each coil 42 depend on whether any objects overlap that coil. If, for example, all of coils 42 exhibit their expected nominal response to the applied signals (or there is no change in response to the applied signals from previous scans), control circuitry 16 can conclude that no external objects have been added to the wireless power transmitting device. If one of coils 42 exhibits a different response (e.g., a response varying from a normal no-objects-present baseline), control circuitry 16 can conclude that a new external object (potentially a compatible wireless power receiving device) is present.

In response to concluding that an external object has been added to the wireless power transmitting device (in addition to the originally present primary wireless power receiving device), power transmitting device 12 may send a notification to the originally present primary wireless power receiving device 24A indicating that a new object has been detected. The notification may be sent by wireless power transmitting device 12 during period 304 using in-band communication.

Any desired suitable action may be taken by primary wireless power receiving device 24A during time period 310 in response to the notification indicating a new object is present. The notification sent by the power transmitting device to the primary wireless power receiving device may serve multiple purposes. First, the notification may alert the primary wireless power receiving device to an interruption in wireless power transmission. For example, prior to time period 304, wireless power transmitting device 12 may be transmitting wireless power signals to primary wireless power receiving device 24A. However, when it is determined that a new object is present on the charging mat, the charging mat may temporarily cease transmitting the wireless power signals (e.g., to enable more detailed scanning to identify the newly added object). By notifying the primary wireless power receiving device that a new object has been detected, the primary wireless power receiving device is prepared for the imminent interruption in wireless power transfer.

Additionally, the notification sent to the primary wireless power receiving device (alerting that a new object is present) may enable the primary wireless power receiving device to prepare for the possibility that the newly added object is a supported wireless power receiving device (e.g., a paired device). For example, before $t_2$, primary power receiving device 24A may use an antenna (e.g., a Bluetooth antenna) to scan for communications (e.g., Bluetooth communications from secondary power receiving device 24B) at a first rate. In response to the notification, the primary power receiving device 24A may use the antenna to scan for communications at a second rate that is faster than the first rate. By increasing the rate of scanning for communications, the primary power receiving device 24A may receive any communications from secondary power receiving device 24B at an earlier time than if the rate was not increased. In the event that the newly added object is not a supported wireless power receiving device, primary power receiving device 24A will not actually receive the expected wireless communication. However, in this case, the faster scan rate may time-out after a predetermined length of time (e.g., after the predetermined length of time the scan rate will revert back to the first scan rate) without any adverse effects.

Additional action may be taken by primary power receiving device 24A during time period 310 in response to the notification that a new object has been added. For example, primary power receiving device 24A may pre-load an animation to display in a synchronous output with a secondary power receiving device. This way, if the newly added object is a secondary power receiving device, the animation will be ready to display as quickly as possible.

Also at $t_2$, after sending the notification to the primary power receiving device 24A, power transmitting device may perform a more detailed scan of the coils during time period 306. This detailed scan may be used to determine if the newly added object is a supported wireless power receiving device, if a foreign object has been added to the charging mat, which coils should be used to transmit wireless power signals if the newly added object is a supported wireless power receiving device, etc. Next (in the scenario where the newly added object is a secondary wireless power receiving device), during time period 308, wireless power transmitting device 12 may use in-band communications to transmit a wireless power transmitting device identifier to the secondary power receiving device. The wireless power transmitting device identifier may identify the wireless power transmitting device (e.g., to distinguish from other nearby wireless power transmitting devices). The wireless power transmitting device identifier may be a 14-bit value that is generated by the wireless power transmitting device upon start-up, or any other desired type of value that can be used to identify the wireless power transmitting device.

After receiving the wireless power transmitting device identifier from the wireless power transmitting device, the secondary wireless power receiving device may advertise the wireless power transmitting device identifier, its own unique device identifier, and its battery charge level at $t_4$. The secondary wireless power receiving device may advertise the wireless power transmitting device identifier, its own unique device identifier, and its battery charge level using wireless communication (e.g., Bluetooth communication). As previously mentioned, the wireless power transmitting device identifier, the paired device identifier, and the battery charge level may transmitted in a single step or in one more stages. For example, the battery charge level may be provided after the wireless power transmitting device identifier and the paired device identifier (e.g., during synchronized output negotiations). During time period 312, the primary wireless power receiving device may receive the information from the secondary wireless power receiving device. The primary wireless power receiving device may determine if it recognizes the secondary wireless power receiving device (e.g., do the devices have the same user) and determine if the received wireless power transmitting device identifier matches the wireless power transmitting device identifier already stored in the primary power receiving device. If the secondary wireless power receiving device and the primary wireless power receiving device are on the same charging mat and have the same user, the power receiving devices may negotiate a time (e.g., during time periods 312 and 314) to perform the first step of the synchronized output. For example, the synchronized output may begin at $t_6$.

The synchronous output from wireless power receiving devices 24A and 24B may include one or more of audio feedback, visual feedback, haptic feedback, and any other desired type of feedback. For example, the devices may use input-output devices 56 such as the display 68 (e.g., to display an animation or other visual feedback), a status indicator light (e.g., to provide visual feedback) a speaker (e.g., to provide an audio indicator), or a vibrator (e.g., to provide haptic feedback) in the synchronous output event (sometimes referred to as an indicator or notification). Different wireless power receiving devices may provide different feedback during the synchronous indicator event. For example, a cellular telephone and wristwatch may use the display to display an animation and use a vibrator to provide haptic feedback. A battery case for earbuds may use a status indicator light to provide visual feedback.

Figure 7:
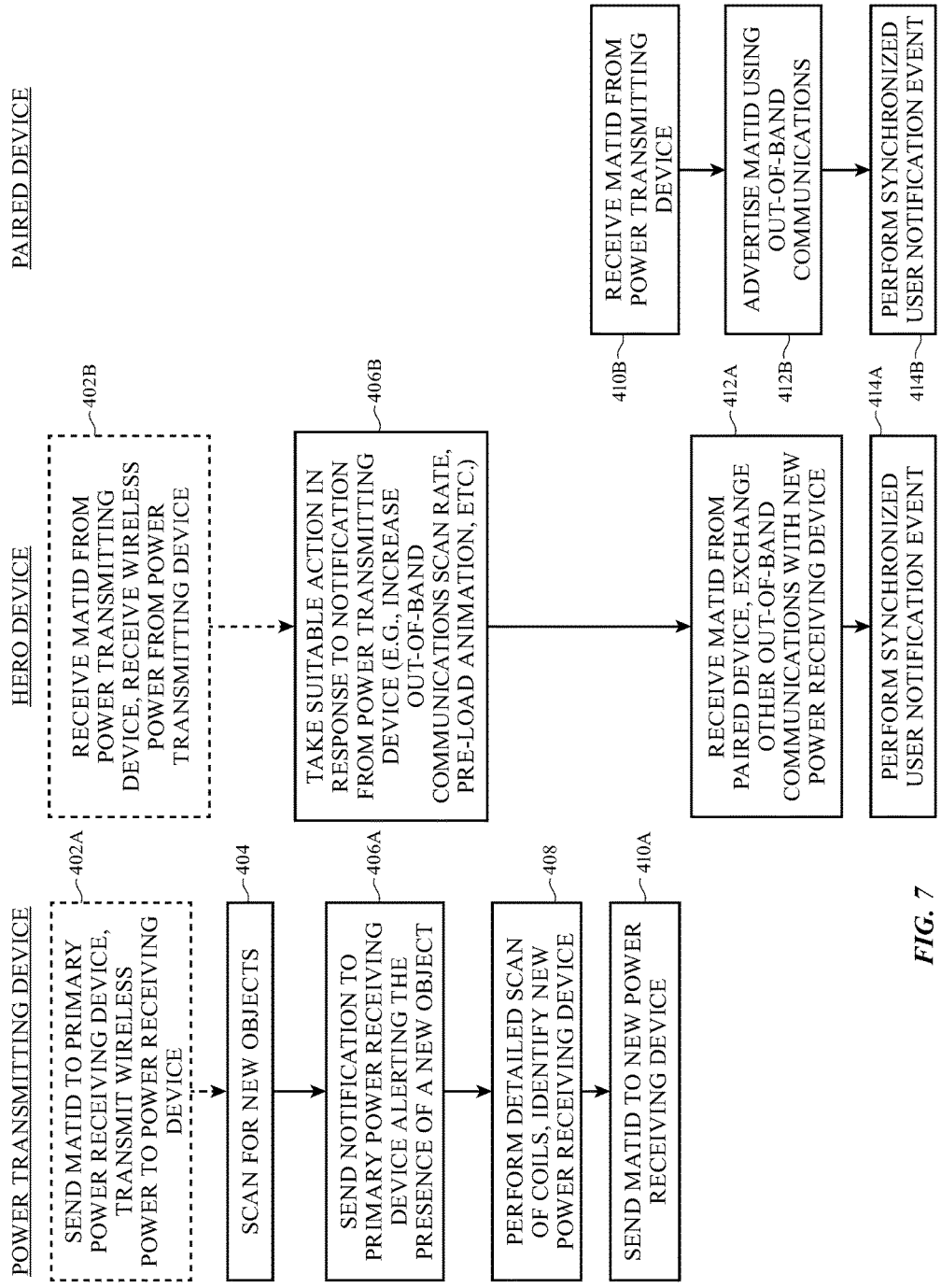
FIG. 7 is a flow chart of illustrative operations involved in using a wireless power transmitting device, a primary wireless power receiving device, and a secondary wireless power receiving device when a secondary wireless power receiving device is added to a wireless power transmitting device where a primary wireless power receiving device is already present in accordance with an embodiment.

FIG. 7 is a flow chart of illustrative operations involved in using charging system 8. In particular, FIG. 7 shows illustrative operations involved in using a power transmitting device, a primary power receiving device (e.g., a hero device), and a secondary power receiving device (e.g., a paired device) when a secondary power receiving device is added to a power transmitting device where a primary power receiving device is already present (as discussed in connection with FIGS. 4 and 6).

The operations of block 402A and 402B may occur before the paired device is added to the power transmitting device. In other words, the hero device is resting on the charging surface of the power transmitting device. During the operations of 402A, the power transmitting device may send a power transmitting device identifier (MatID) to the hero device. The power transmitting device may send the power transmitting device identifier to the hero device using out-of-band communications (e.g., Bluetooth communications) or using in-band communications (e.g., frequency-shift keying). Wireless power may also be conveyed from the power transmitting device to the hero device during the operations of block 402A (e.g., wireless power may be transferred at the same time as the power transmitting device identifier is sent to the hero device).

Any desired type of value that can be used to identify the wireless power transmitting device may be used as the wireless power transmitting device identifier (MatID). The wireless power transmitting device identifier may be a 14-bit value that is generated by a wireless power transmitting device upon start-up. This means that the power transmitting device will maintain the same wireless power transmitting device identifier while the power transmitting device is connected to a power source (e.g., a wall outlet). If the power transmitting device is disconnected from the power source (e.g., unplugged from the wall outlet), the power transmitting device will generate a new, different wireless power transmitting device identifier when reconnected to the power source. This example is merely illustrative. If desired, the power transmitting device may maintain the same device identifier (MatID) throughout the lifetime of the device.

During the operations of block 402B, the hero device (that is resting on the charging surface of the power transmitting device) may receive the power transmitting device identifier (MatID). The hero device may receive the power transmitting device identifier using either in-band communication or out-of-band communication. The hero device may store (e.g., in memory) the power transmitting device identifier for later reference. The hero device may also receive wireless power signals from the power transmitting device (e.g., the hero device may be charged by the power transmitting device).

While the hero device is present on the charging surface of the power transmitting device, the power transmitting device may scan for newly placed objects during the operations of block 404. During the operations of block 404, the power transmitting device may selectively switch each coil into use, apply an excitation signal (sometimes referred to as an impulse signal or probe signal) to that coil, and use signal measurement circuitry to measure a corresponding response. The measured characteristics of each coil may be used by the power transmitting device to determine if any new objects have been added to the charging surface. If it is determined that no new objects have been added to the charging surface (e.g., the measured characteristics of each coil match the expected characteristics of each coil for when no objects are present or the measured characteristics of each coil match the previous set of measurements for the coils), the power transmitting device may continue to intermittently scan for new objects.

If a new object is detected, the wireless power transmitting device may proceed to the operations of block 406A. During the operations of block 406A, the wireless power transmitting device may send a notification to the (already present) hero device indicating that a new object has been detected on the power transmitting device. The power transmitting device may send the notification to the hero device using out-of-band communications (e.g., Bluetooth communications) or using in-band communications (e.g., frequency-shift keying).

During the operations of block 406B, the hero device may receive the notification from the power transmitting device that a new object has been added and, in response, take suitable action. The notification may allow the hero device to prepare for the possibility that the new object is a wireless power receiving device. If the new object is in fact a wireless power receiving device, the hero device may be ready to perform desired actions as quickly as possible (due to the preparation after receiving the notification). If the new object is not a wireless power receiving device, the hero device may revert back to its previous state (e.g., sleep state) without adverse effects.

During the operations of block 406B, the hero device may increase an out-of-band communications scan rate. If the new object is a wireless power receiving device, the hero device will receive an out-of-band communication from the new wireless power receiving device. It is desirable for the hero device to receive this communication as quickly as possible. Increasing the out-of-band communications scan may reduce the length of time it takes for the hero device to receive a communication from the (newly placed) paired device. The hero device's out-of-band communications scan may involve scanning different frequency channels.

For example, the hero device may have an antenna used to receive the out-of-band communications. The antenna may be tuned to receive communications in one or more frequency channels. There may be a delay between the antenna being tuned to a particular frequency channel, the antenna may be intermittently powered down to conserve power, or both. For example, at a first scan rate the antenna may switch between frequency channels every 500 milliseconds (e.g., a first length of time). In response to the notification, the hero device may increase the scan rate to a second scan rate that is faster than first scan rate. At the second scan rate the antenna may switch between frequency channels every 100 milliseconds (e.g., a second length of time that is shorter than the first length of time).

Other actions may be taken by the hero device in response to receiving the notification indicating the new object is present. For example, during the operations of block 406B, the hero device may pre-load an animation for a synchronized user notification event (that may be performed if the new object is a wireless power receiving device) or make other desired preparations for a synchronized user notification event.

If the new object is not a wireless power receiving device, the hero device may not receive any communications from the new object. The hero device may therefore revert back to the original communications scan rate after a given length of time (e.g., the increased scan rate may time-out after the given length of time). The length of time before time-out may be 1 second, 2 seconds, less than 2 seconds, greater than 1 second, or any other desired length of time.

During the operations of block 408, the wireless power transmitting device may perform a detailed scan of the coils. Using the scan results and/or in response to receiving a device identifier (e.g., information including the type of device, user of the device, etc.) from the newly placed power receiving device, the wireless power transmitting device may confirm that the newly placed object is a supported wireless power receiving device. Also during the operations of block 408, the wireless power transmitting device may perform foreign object detection (ensuring that no foreign objects have been added to the charging surface).

During the operations of block 410A, the wireless power transmitting device may send the wireless power transmitting device identifier (MatID) to the newly placed wireless power receiving device (e.g., the paired device). The power transmitting device may send the wireless power transmitting device identifier to the paired device using out-of-band communications (e.g., Bluetooth communications) or using in-band communications (e.g., frequency-shift keying).

The paired device may receive the wireless power transmitting device identifier from the wireless power transmitting device during the operations of block 410B. The paired device may then immediately advertise (using out-of-band communication such as Bluetooth communication) the received wireless power transmitting device identifier during the operations of block 412B. By advertising the wireless power transmitting device identifier, the paired device may establish a communication link with potential hero device candidates (e.g., other power receiving devices on the charging mat that may act as a hero device for the paired device).

During the operations of block 412A, the hero device (that was originally present on the charging mat) receives the out-of-band (e.g., Bluetooth) communication from the paired device (that is newly added on the charging mat). The hero device may receive a wireless power transmitting device identifier (e.g., a first wireless power transmitting device identifier) from the paired device. The hero device may compare the first wireless power transmitting device identifier to the wireless power transmitting device identifier (e.g., a second wireless power transmitting device identifier) that is stored in the hero device. If the first wireless power transmitting device identifier matches the second wireless power transmitting device identifier, the hero device may conclude that the paired device is present on the same charging mat as the hero device. If the first wireless power transmitting device identifier does not match the second wireless power transmitting device identifier, the hero device may conclude that the paired device is not present on the same charging mat.

If the hero device determines that the paired device is not present on the same charging mat, the hero device may optionally cease communications with the paired device. However, if the hero device determines that the paired device is present on the same charging mat as the hero device, the hero device may exchange additional communications (e.g., out-of-band communications such as Bluetooth communications) with the paired device. For example, the paired device may send the hero device information that identifies the user of the paired device (e.g., to allow the hero device to determine if the paired device and hero device share the same user) or a paired device identifier (e.g., to allow the hero device to determine if the paired device is on a list of known paired devices in the hero device). The hero device may only serve as the hero device for the paired device if the hero device recognizes the paired device (e.g., the hero device and paired device have the same user). The hero device may also obtain battery charge status information from the paired device. The hero device and paired device may also negotiate a time to start a synchronized user notification event during the operations of block 412A.

The aforementioned description of communications between the paired device and the hero device is merely illustrative, and in general the paired device and hero device may exchange information in any desired manner. For example, the paired device may transmit the power transmitting device identifier, its own device identifier, and its own battery charge status information in a single transaction. Synchronized user notification negotiations may then occur in subsequent transactions. In another embodiment, the paired device may transmit the power transmitting device identifier and its own device identifier in one transaction.

The hero device may then poll the paired device for battery charge status information in a separate transaction. Synchronized user notification negotiations may then occur in subsequent transactions. In yet another embodiment, the paired device may transmit the power transmitting device identifier, its own device identifier, its own battery charge status information, and a timeout to start the user notification in a single transaction. The paired device and hero device then start the user notification automatically without further interaction according to the set timeout.

During the operations of blocks 414A and 414B, the paired device and hero device may perform a synchronized user notification event. Based on the negotiated start time (or using a predetermined scheme such as starting the user notification event a given length of time after the paired device starts to advertise the power transmitting device identifier), the paired device and user device may each start the user notification event at the same time (e.g., the output may commence at an identical time or nearly identical time such as times that are within 200 milliseconds of each other, within 100 milliseconds of each other, etc.). The user notification event may include any desired audio, visual, and/or haptic feedback. After the user notification event (or at any other desired time after the paired device is placed on the power transmitting device), the power transmitting device may begin delivering wireless power to the paired device. The power transmitting device may temporarily forego delivering wireless power to the hero device when the paired device is added to the power transmitting device (e.g., during the detailed scan of block 408). The power transmitting device may resume delivering wireless power to the hero device at any desired time (e.g., after the user notification event of block 414A).

Figure 8:
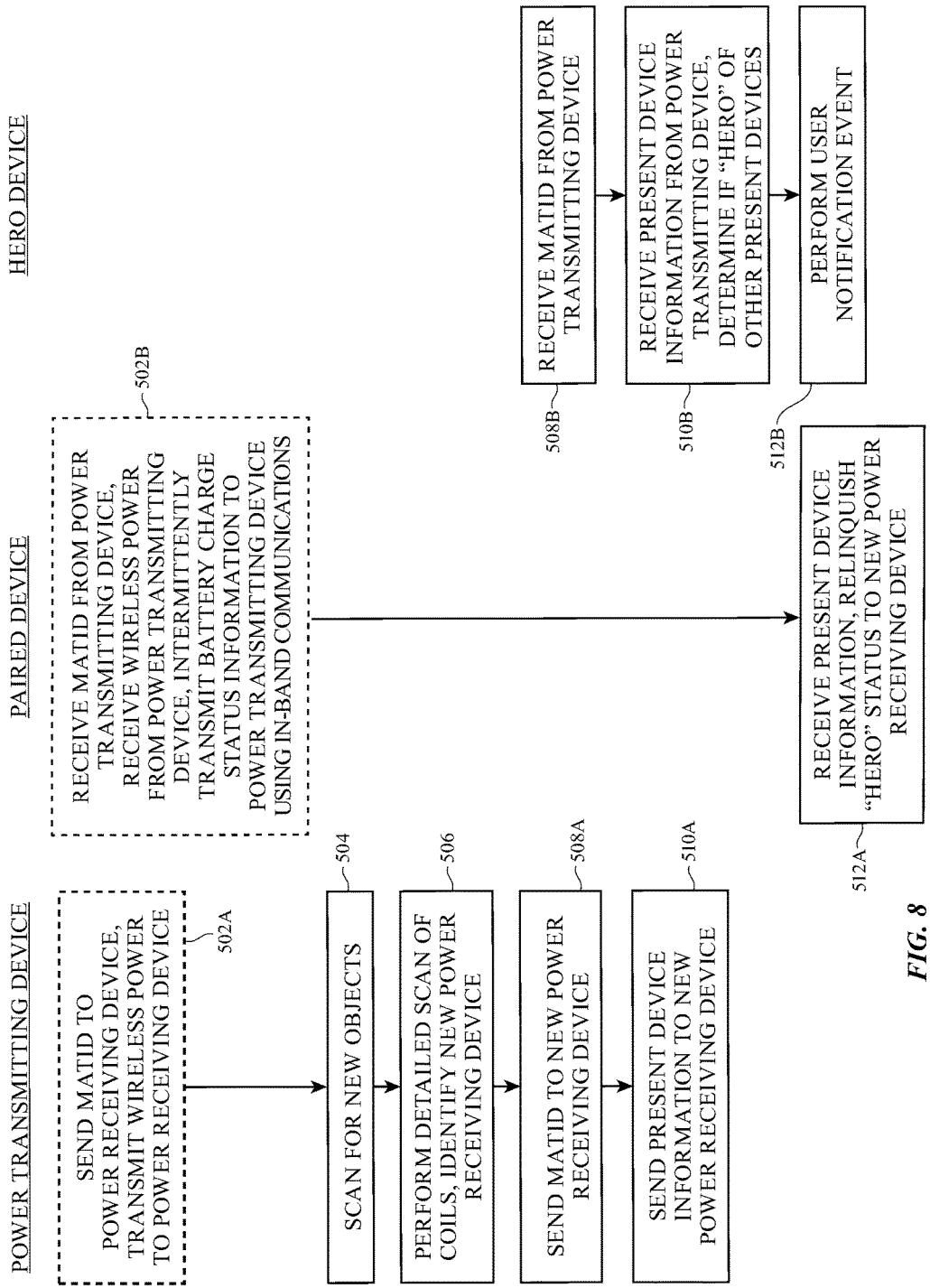
FIG. 8 is a flow chart of illustrative operations involved in using a wireless power transmitting device, a primary wireless power receiving device, and a secondary wireless power receiving device when a primary wireless power receiving device is added to a wireless power transmitting device where a secondary wireless power receiving device is already present in accordance with an embodiment.

FIG. 8 is a flow chart of illustrative operations involved in using charging system 8. In particular, FIG. 8 shows illustrative operations involved in using a power transmitting device, a primary power receiving device (e.g., a hero device), and a secondary power receiving device (e.g., a paired device) when a primary power receiving device is added to a power transmitting device where a secondary power receiving device is already present (as discussed in connection with FIG. 5).

The operations of block 502A and 502B may occur before the hero device is added to the power transmitting device. In other words, the paired device is resting on the charging surface of the power transmitting device. During the operations of 502A, the power transmitting device may send a power transmitting device identifier (MatID) to the paired device. The power transmitting device may send the power transmitting device identifier to the paired device using out-of-band communications (e.g., Bluetooth communications) or using in-band communications (e.g., frequency-shift keying). Wireless power may also be conveyed from the power transmitting device to the paired device during the operations of block 502A (e.g., wireless power may be transferred at the same time as the power transmitting device identifier is sent to the paired device).

During the operations of block 502B, the paired device (that is resting on the charging surface of the power transmitting device) may receive the power transmitting device identifier (MatID). The paired device may receive the power transmitting device identifier using either in-band communication or out-of-band communication. The paired device may store (e.g., in memory) the power transmitting device identifier for later reference. The paired device may also receive wireless power signals from the power transmitting device (e.g., the paired device may be charged by the power transmitting device).

Also during the operations of block 502B, the paired device may transmit its own device identifier to the power transmitting device. The paired device may also intermittently transmit battery charge status information to the power transmitting device. The paired device may optionally send its device identifier with every battery charge status report if desired, or the paired device may send its device identifier once then only send battery charge status information in subsequent reports. The paired device may send the battery charge status information and device identifier to the power transmitting device using out-of-band communications (e.g., Bluetooth communications) or using in-band communications (e.g., amplitude-shift keying). The paired device may send the battery charge status information (sometimes referred to as battery charge status, battery charge information, etc.) to the power transmitting device at predetermined intervals so that the power transmitting device has the battery charge status information stored in the event that the power transmitting device needs to send the battery charge status information to another wireless power receiving device. The time interval between the paired device sending the battery charge status information to the power transmitting device may be any desired time interval (e.g., 1 second, less than 1 second, greater than 1 second, greater than 5 seconds, greater than 10 seconds, greater than 30 seconds, greater than 60 seconds, less than 5 seconds, less than 10 seconds, less than 30 seconds, less than 60 seconds, less than 500 milliseconds, greater than 200 milliseconds, etc.).

While the paired device is present on the charging surface of the power transmitting device, the power transmitting device may scan for newly placed objects during the operations of block 504. During the operations of block 504, the power transmitting device may selectively switch each coil into use, apply an excitation signal (sometimes referred to as an impulse signal or probe signal) to that coil, and use signal measurement circuitry to measure a corresponding response. The measured characteristics of each coil may be used by the power transmitting device to determine if any new objects have been added to the charging surface. If it is determined that no new objects have been added to the charging surface (e.g., the measured characteristics of each coil match the expected characteristics of each coil for when no objects are present or the measured characteristics of each coil match the previous set of measurements for the coils), the power transmitting device may continue to intermittently scan for new objects.

If a new object is detected, the wireless power transmitting device may proceed to the operations of block 506. During the operations of block 506, the wireless power transmitting device may perform a detailed scan of the coils. Using the scan results and/or in response to receiving a device identifier (e.g., information including the type of device, user of the device, etc.) from the newly placed power receiving device, the wireless power transmitting device may confirm that the newly placed object is a supported wireless power receiving device. Also during the operations of block 506, the wireless power transmitting device may perform foreign object detection (ensuring that no foreign objects have been added to the charging surface).

During the operations of block 508A, the wireless power transmitting device may send the wireless power transmitting device identifier (MatID) to the newly placed wireless power receiving device (e.g., the hero device). The power transmitting device may send the wireless power transmitting device identifier to the hero device using out-of-band communications (e.g., Bluetooth communications) or using in-band communications (e.g., frequency-shift keying).

The hero device may receive the wireless power transmitting device identifier from the wireless power transmitting device during the operations of block 508B. At this point, it is desirable for the hero device to determine if any other supported wireless power receiving devices are also present on the wireless power transmitting device (e.g., so that the hero device can display battery charge status information of paired devices as shown in FIG. 5). The hero device may obtain this present device information using either in-band communication or out-of-band communication.

For example, consider a scenario in which the paired device (originally present on the mat) has Bluetooth communication disabled. Because the hero device cannot obtain the battery charge status information of the paired device directly (e.g., using out-of-band communication), the hero device may receive the battery charge status information of the paired device from the power transmitting device. During the operations of block 510A, the wireless power transmitting device may send present device information to the newly placed hero device. The present device information may include information such as a unique device identifier associated with the paired device (e.g., information identifying the type of wireless power receiving device that is present on the power transmitting device), and battery charge status information associated with that wireless power receiving device. Present device information for a particular power receiving device may be referred to as a present device packet. Because the wireless power transmitting device is intermittently receiving the present device information from the paired device (block 502B), the wireless power transmitting device has (relatively) up-to-date battery charge status information of the paired device ready to send to the hero device when the hero device is added to the charging mat (reducing latency between the hero device being placed on the charging mat and the hero device displaying battery charge status information of the paired device). The power transmitting device may send one or more present device packets to the hero device using out-of-band communications (e.g., Bluetooth communications) or using in-band communications (e.g., frequency-shift keying).

During the operations of block 510B, the hero device may receive the present device packets from the power transmitting device. The hero device may use the present device packets to determine if the other devices present on the power transmitting device are indeed paired devices associated with the hero device (e.g., the hero device and the paired device share the same user or the paired device is on a list of paired devices in the hero device).

In another scenario, the paired device already present on the charging mat may have Bluetooth communications enabled. In this scenario, the paired device may send the power transmitting device identifier and/or battery charge status information to the hero device using Bluetooth communications (e.g., before the hero device is placed on the charging mat or after the hero device is placed on the charging mat). The hero device may confirm that the paired device is on the same power transmitting device as the hero device (e.g., by comparing a MatID from the paired device to a MatID from the power transmitting device) and may confirm that the paired device is associated with the hero device (e.g., the hero device and the paired device share the same user or the paired device is on a list of paired devices in the hero device). The hero device may strive to obtain the present device information as quickly as possible. Therefore, if the hero device receives present device information from the paired device via Bluetooth communication, the hero device may omit the operations of block 510B.

In other words, when the paired device is in a first operating mode (sometimes referred to as a first wireless communications mode) where a particular out-of-band communication (e.g., Bluetooth communication) is enabled, the hero device may receive battery charge status information of the paired device from the paired device using the out-of-band communication. However, if the paired device is in a second operating mode (sometimes referred to as a second wireless communications mode) where the particular out-of-band communication (e.g., Bluetooth communication) is disabled, the hero device may receive battery charge status information of the paired device from the power transmitting device using in-band communication.

During the operations of block 512B, the hero device may perform a user notification event. The paired device 512A may also optionally perform a user notification event at the same time (e.g. synchronously) as the hero device. Based on a negotiated start time (or using a predetermined scheme such as starting the user notification event a given length of time after the paired device starts to advertise its transmitting device identifier), the paired device and hero device may each start the user notification event at the same time (e.g., the output may commence at an identical time or nearly identical time such as times that are within 200 milliseconds of each other, within 100 milliseconds of each other, etc.). The user notification event from the hero device and/or paired device may include any desired audio, visual, and/or haptic feedback.

Also during the operations of block 512A, the originally paired device may relinquish 'hero' status to the newly placed power receiving device. The paired device may receive a communication indicating the presence of the new power receiving device. For example, the paired device may receive an in-band communication from the power transmitting device (e.g., during block 510A) or an out-of-band communication from the hero device. If the paired device recognizes the hero device (e.g., the hero device and the paired device share the same user or the hero device is on a list of paired devices in the paired device) and based on the predetermined hierarchy of devices, the paired device may relinquish hero status to the newly placed device. Relinquishing hero status to the newly placed device may mean that the paired device foregoes displaying battery charge status information of itself and optionally other present devices.

For example, consider a scenario in which only a wristwatch is present on the power transmitting device. The wristwatch may display a battery charge status indicator (e.g., battery charge status indicator 74 in FIG. 5) indicating the battery charge status of the wristwatch. Then, a cellular telephone may be placed on the power transmitting device. The wristwatch may receive information indicating that the cellular telephone is present on the same power transmitting device as the wristwatch and that the cellular telephone is a hero device of the wristwatch. Therefore, the wristwatch foregoes displaying the battery charge status indicator indicating the battery charge status of the wristwatch. This battery charge status indicator may instead be displayed on the cellular telephone.

In another scenario, a wristwatch and a battery case for earbuds are present on the power transmitting device. The wristwatch may display a first battery charge status indicator (e.g., battery charge status indicator 74 in FIG. 5) indicating the battery charge status of the wristwatch and a second battery charge status indicator indicating the battery charge status of the battery case. Then, a cellular telephone may be placed on the power transmitting device. The wristwatch may receive information indicating that the cellular telephone is present on the same power transmitting device as the wristwatch and that the cellular telephone is a hero device of the wristwatch. Therefore, the wristwatch foregoes displaying the first battery charge status indicator indicating the battery charge status of the wristwatch and the second battery charge status indicator indicating the battery charge status of the battery case. These battery charge status indicators may instead be displayed on the cellular telephone.

After the user notification event (or at any other desired time after the hero device is placed on the power transmitting device), the power transmitting device may being delivering wireless power to the hero device. The power transmitting device may temporarily forego delivering wireless power to the paired device when the hero device is added to the power transmitting device (e.g., during the detailed scan of block 506). The power transmitting device may resume delivering wireless power to the paired device at any desired time (e.g., after the user notification event of block 512B).

The foregoing is merely illustrative and various modifications can be made to the described embodiments. The foregoing embodiments may be implemented individually or in any combination.

What is claimed is:

1. An electronic device that is configured to receive wireless power from a power transmitting device, the electronic device comprising:
    a coil that is configured to receive wireless power signals from the power transmitting device;
    a display; and
    control circuitry configured to:
        receive battery charge status information that is associated with a first electronic device that is present on the power transmitting device with the electronic device;
        display the battery charge status information on the display; and
        in accordance with receiving information indicating placement of a second electronic device on the power transmitting device while the first electronic device is present on the power transmitting device, forgo displaying battery charge status information of the first electronic device on the display.

2. The electronic device of claim 1, wherein receiving the battery charge status information that is associated with the first electronic device that is present on the power transmitting device comprises receiving the battery charge status information that is associated with the first electronic device while the first electronic device is wirelessly charged by the power transmitting device.

3. The electronic device of claim 1, wherein forgoing displaying battery charge status information of the first electronic device on the display comprises forgoing displaying battery charge status information of the first electronic device on the display in accordance with receiving information indicating placement of the second electronic device on the power transmitting device while the first electronic device is wirelessly charged by the power transmitting device.

4. The electronic device of claim 1, wherein the control circuitry is configured to:
- determine whether the second electronic device or the electronic device has a higher precedence amongst a hierarchy of devices; and
- responsive to determining that the second electronic device has a higher precedence amongst the hierarchy of devices, forgo displaying battery charge status information of the first electronic device on the display.

5. The electronic device of claim 1, wherein the control circuitry is configured to display the battery charge status information on the display in accordance with determining that the first electronic device is associated with the same user as the electronic device.

6. The electronic device of claim 1, wherein the control circuitry is configured to forgo displaying battery charge status information of the first electronic device on the display in accordance with determining that the second electronic device is associated with the same user as the electronic device.

7. The electronic device of claim 1, wherein the control circuitry is configured to:
- in accordance with receiving information indicating placement of a second electronic device on the power transmitting device while the first electronic device is present on the power transmitting device, transfer battery charge status information of a battery of the electronic device to the power transmitting device.

8. The electronic device of claim 7, wherein transferring the battery charge status information of a battery of the electronic device to the power transmitting device comprises transferring data representing the battery charge status information using the coil.

9. The electronic device of claim 1, wherein displaying the battery charge status information on the display comprises simultaneously displaying, on the display, the battery charge status information of the first electronic device and battery charge status information of a battery of the electronic device.

10. The electronic device of claim 1, wherein the control circuitry is configured to, in accordance with receiving information indicating placement of the second electronic device on the power transmitting device while the first electronic device is present on the power transmitting device, discontinue displaying the battery charge status information of the first electronic device on the display, wherein discontinuing displaying the battery charge status information of the first electronic device on the display comprises displaying an animation on the display.

11. The electronic device of claim 1, further comprising an antenna coupled to the control circuitry, wherein the control circuitry is configured to:
- receive a device identifier identifying the power transmitting device from the power transmitting device using the coil; and
- transmit the device identifier to the second electronic device using the antenna.

12. A non-transitory computer-readable storage medium storing one or more programs configured to be executed by one or more processors of an electronic device with a display, the one or more programs including instructions for:
- receiving battery charge status information that is associated with a first electronic device that is present on a power transmitting device with the electronic device;
- displaying the battery charge status information on the display; and
- in accordance with receiving information indicating placement of a second electronic device on the power transmitting device while the first electronic device is present on the power transmitting device, forgoing displaying battery charge status information of the first electronic device on the display.

13. The non-transitory computer-readable storage medium of claim 12, wherein receiving the battery charge status information that is associated with the first electronic device that is present on the power transmitting device comprises receiving the battery charge status information that is associated with the first electronic device while the first electronic device is wirelessly charged by the power transmitting device.

14. The non-transitory computer-readable storage medium of claim 12, wherein forgoing displaying battery charge status information of the first electronic device on the display comprises forgoing displaying battery charge status information of the first electronic device on the display in accordance with receiving information indicating placement of the second electronic device on the power transmitting device while the first electronic device is wirelessly charged by the power transmitting device.

15. The non-transitory computer-readable storage medium of claim 12, wherein the one or more programs further include instructions for:
- determining whether the second electronic device or the electronic device has a higher precedence amongst a hierarchy of devices; and
- responsive to determining that the second electronic device has a higher precedence amongst the hierarchy of devices, forgoing displaying battery charge status information of the first electronic device on the display.

16. The non-transitory computer-readable storage medium of claim 12, wherein displaying the battery charge status information on the display comprises displaying the battery charge status information on the display in accordance with determining that the first electronic device is associated with the same user as the electronic device.

17. The non-transitory computer-readable storage medium of claim 12, wherein forgoing displaying battery charge status information of the first electronic device on the display comprises forgoing displaying battery charge status information of the first electronic device on the display in accordance with determining that the second electronic device is associated with the same user as the electronic device.

18. The non-transitory computer-readable storage medium of claim 12, wherein displaying the battery charge status information on the display comprises simultaneously displaying, on the display, the battery charge status information of the first electronic device and battery charge status information of a battery of the electronic device.

19. The non-transitory computer readable storage medium of claim 12, wherein the one or more programs further include instructions for:
- in accordance with receiving information indicating placement of the second electronic device on the power transmitting device while the first electronic device is present on the power transmitting device, discontinuing displaying the battery charge status information of the first electronic device on the display, wherein discontinuing displaying the battery charge status information of the first electronic device on the display comprises displaying an animation on the display.

20. A method of operating an electronic device that is configured to receive wireless power from a power transmitting device, wherein the electronic device comprises a coil that is configured to receive wireless power signals from the power transmitting device and a display, the method comprising:

receiving battery charge status information that is associated with a first electronic device that is present on the power transmitting device with the electronic device;

displaying the battery charge status information on the display; and in accordance with receiving information indicating placement of a second electronic device on the power transmitting device while the first electronic device is present on the power transmitting device, forgoing displaying battery charge status information of the first electronic device on the display.

* * * * *